US006948185B1

(12) United States Patent
Chapel et al.

(10) Patent No.: US 6,948,185 B1
(45) Date of Patent: Sep. 20, 2005

(54) PROCESS AND DEVICE FOR SYNCHRONIZING AN MPEG DECODER

(75) Inventors: Claude Chapel, Rennes (FR); Franck Abelard, Chateaubourg (FR); Jean-Charles Guillemot, Thorigne Foulliard (FR)

(73) Assignee: Thomson Licensing S.A., Boulogne-Billancourt (FR)

( * ) Notice: Subject to any disclaimer, the term of this patent is extended or adjusted under 35 U.S.C. 154(b) by 848 days.

(21) Appl. No.: 09/631,808

(22) Filed: Aug. 3, 2000

(30) Foreign Application Priority Data

Aug. 13, 1999 (FR) ........................................... 99 10466

(51) Int. Cl.[7] ................................................ H04N 7/173
(52) U.S. Cl. .......................... 725/139; 386/95; 386/109
(58) Field of Search ........................... 386/109–112, 83, 386/65, 68, 70, 95; 725/139, 141, 142; 713/501

(56) References Cited

U.S. PATENT DOCUMENTS 5,832,256 A 11/1998 Kim
5,859,949 A 1/1999 Yanagihara
6,473,557 B2 * 10/2002 Schipper ...................... 386/65
6,621,979 B1 * 9/2003 Eerenberg et al. ............ 386/68

FOREIGN PATENT DOCUMENTS

| | | | |
|---|---|---|---|
| EP | 0731615 | 9/1996 | |
| EP | 0896479 | 2/1999 | |
| WO | 97/46027 | 12/1997 | |
| WO | WO 99/33265 | * 7/1999 | ............ H04N/5/91 |

OTHER PUBLICATIONS

Search Report for French Patent Appln. No. 9910466.

* cited by examiner

*Primary Examiner*—Vincent Boccio
(74) *Attorney, Agent, or Firm*—Joseph S. Tripoli; Robert B. Levy; Joseph J. Kolodka

(57) ABSTRACT

A process for synchronizing an MPEG decoder, characterized by the process of calculating an actual instant of presentation Tpres of the video of an image, this instant relating to a local clock LSTC, further calculating an offset STOC between Tpres, being the calculated instant of presentation and the PTS label corresponding to the instant of presentation desired by the coder for the video of this image, so as to define a virtual clock VSTC=STCO+LSTC, the presentation of the video corresponding to this image being made at the PTS dates relating to the virtual clock VSTC, wherein this process relates to satellite decoders, MPEG decoders, as well, as digital TV receivers, utilizing a hard disk for recording coded data.

13 Claims, 4 Drawing Sheets

PROCESS AND DEVICE FOR SYNCHRONIZING AN MPEG DECODER

FIELD OF THE INVENTION

The invention relates to a process for synchronizing an MPEG decoder for the decoding of compressed data originating from a recording medium. The invention also relates to an MPEG decoder implementing such a process, a satellite decoder or a television receiver comprising such a decoder.

BACKGROUND OF THE INVENTION

FIG. 1 represents a configuration of a satellite decoder using a recording of an MPEG data stream on hard disc.

An MPEG program stream (PS) is received at the input of a multiplexer 1. The latter outputs the data of a program in the form of PES data packets (the initials standing for Packetized Elementary Stream). These data are sent to a memory 2 and then to a hard disc 4 by way of a disc interface 3, for their recording.

For the reading of the data, the hard disc 4 is linked to a disc interface 5 and then to a memory 6. A first memory output is linked to a video MPEG decoding circuit 7 and a second memory output is linked to an audio MPEG decoding circuit 8. The output from each of these circuits corresponds to the video and audio cues transmitted to digital/analogue converters and then to a television receiver (which are not represented in the figure).

The memory circuit 6 makes it possible, among other things, to demultiplex the audio and video data stored on the hard disc. These video PES and audio PES data are thereafter processed by their respective decoders.

The data stored on the hard disc are the data obtained after demultiplexing the stream. Hence, one is not dealing with storage of the PS program stream, thus avoiding the regeneration of such a stream on reading, the storage of all the programs constituting this stream, or the storage of the scrambled data with recording of key words etc.

The manner of operation of a decoder according to the MPEG standard, in a conventional configuration, that is to say one which receives the data stream directly with a given transmission bit rate, for example via satellite transmission or via cable, is recalled hereinbelow so as to stress the particular characteristics relating to an environment with hard disc, that is to say with intermediate storage of the data on hard disc before decoding.

Management of the buffer memory of a decoder is performed, in the MPEG standard, on the basis of modelling referred to as a virtual memory. Indeed, the coding of each image constituting a sequence is not carried out at constant cost and a buffer memory at the output of the coder is used to deliver a data stream at constant mean bit rate. On the decoder side, a buffer memory is also required so as to deliver, from the constant-bit-rate data stream, variable-cost images. Management of the buffer memory of the decoder is performed on the basis, among other things, of the clocks transmitted by the coder in the data stream and of the tags allocated to the images transmitted and defining the instant of exit from the memory of the decoder, the time gap between the instant of storage of an image in the memory of the coder and the instant of reading of the memory of the decoder having to be the same for each image.

This involves the PCR clock, standing for Program Clock Reference in the MPEG standard, which is a time cue transmitted in the data stream and on the basis of which the synchronization of the decoder is performed.

This also involves the DTS tag, standing for Decoding Time Stamp in the MPEG standard, which is a field transmitted in the stream and which indicates the instant at which an image is to be decoded in the decoder.

The PCR cue present in the transport stream TS is used by the decoder to calculate the time. The PCR therefore delivers the scheduling tag at decoder level.

The DTS gives the decoding schedules, that is to say the instant at which the image must be read from the buffer memory of the decoder and decoded.

The PCR and DTS cues are transmitted respectively in 188-byte packet headers of the transport stream TS and in packet headers of the PES stream, the first packetization step required in the production of a transport stream TS.

The initials PTS, standing for Presentation Time Stamp, correspond to the instant of display of the image and allow the reordering of the images after decoding; the PTS is present in the packet headers of the PES stream.

When the MPEG decoder operates on the basis of the data originating from the hard disc, these data are consumed at the tempo of the decoder. The synchronization signals of the audio and video decoders for displaying the decoded images (VSYNC) are regulated by the local 27 MHz clock so as to deliver 25 images per second approximately.

Since the recording is carried out at the level of the audio and video PESs, the cue relating to the PCR of the PS stream is lost and may not therefore serve in the slaving of the local clock. This absence of slaving generates a management problem at the level of the write and read pointers of the hard disc as well as a synchronization problem at the level of the audio and video signals.

As regards the management of the pointers, two modes are to be considered: the read only mode, that is to say without simultaneous writing of the hard disc, for which the problem is not too troublesome, and the read/write mode.

In read only mode, when a previously recorded stream is replayed, the accuracy of the local clock in free oscillation is sufficient. The variation relative to the nominal value of the recording is found within the duration of the 40 ms video image. The tolerance at television and viewer level is sufficiently large to be able to make do with much lower accuracy than the standards of professional television.

This is because the image synchronization signal (VSYNC) is defined on the basis of the 27 MHz clock. It has a period of 40 ms. A slow drifting of this signal, due to the accuracy of the local clock, is not at all troublesome owing to the fact that the television is at the end of the transmission chain.

On the other hand, in write/read mode (read shifted with respect to write mode, more commonly known as Time Shifting), malfunctions may occur due to the fact that this clock is in free oscillation, it not being possible to slave it to the stream read back from the disc.

When recording and reading are simultaneous, the case of time-shifted replaying, there is a risk that writing will be overtaken by reading on the disc, or that there will be an increase in the delay. Since the drifting is slow, this second case is not too troublesome. On the other hand, if reading overtook writing, that is to say if the read pointer overtook the write pointer and went off to read as yet unwritten memory areas, the image depicted would at best be what has been recorded in this area during a previous recording and the images being recorded could no longer be replayed. This situation can occur when the shift between recording and reading is due to a short pause in reading. In this case, and if the 27 MHz clock is slightly faster than that used by the coder when coding the data, the replaying of the data is faster than their recording and over a long period, that is to say for a recorded program of a certain duration, the read pointer can overtake the write printer. In this mode it is therefore necessary to prohibit such slippage between writing and reading.

One idea would be to slave the local clock to the PCRs (Program Clock References) of the incident stream while being recorded. However, this would not solve another malfunction which may occur on account of the fact that the validity of the recorded data is not known a priori. Since writes and reads are synchronous, in the case where the local clock is synchronized to the PCRs of the incident stream, the delay between reading and writing will be maintained unless the decoder begins to consume the data very quickly. This may happen if the data are corrupted. Indeed, while in the case of a real-time (live) transmission, these erroneous data can be detected immediately upon reading the buffer of the decoder, the same does not hold when recording on hard disc which enables such erroneous data to be detected only after the reading and storage of these data in the buffer of the decoder. When corrupted data are detected by the decoder, the latter re-synchronizes and instantaneously empties the buffer, causing the loss of data and accesses to the hard disc which are repeated for the filling of this buffer. In this case, it may happen that the read pointer overtakes the write pointer. This can occur upon transmission of erroneous cues or upon loss of data transmission owing for example to poor transmission conditions.

As far as the synchronization of the audio and video data is concerned, be it in read only mode or read/write mode, the fact of not being able to initialize and synchronize the local clock to the PCR cue, for example in read only mode, may give rise to a problem of synchronization between the video and the audio. This is because the cues relating to the instants of presentation relative to the local clock cannot be utilized on account of the fact that this clock is no longer synchronized with that of the coder.

The aim of the invention is to alleviate the aforesaid drawbacks.

SUMMARY OF THE INVENTION

Its subject is a process for synchronizing an MPEG decoder for the decoding of compressed data originating from a recording medium, these data consisting of PES (Packetized Elementary Stream) audio and video data packets, characterized in that it comprises:

- a step of calculating an actual instant of presentation Tpres of the video of an image, this instant relating to a local clock LSTC,
- a step of calculating an offset STCO between this calculated instant of presentation and the PTS label corresponding to the instant of presentation desired by the coder for the video of this image, so as to define a virtual clock VSTC=STCO+LSTC,
- a presentation of the video and of the audio corresponding to this image at the PTS dates relating to the virtual clock VSTC.

According to a particular characteristic, the time of transit of the video through the buffer of the video decoder is imposed at a predetermined value TVBV.

According to a variant, the determination of TVBV is dependent on the bit rate of recording of the PES data on the recording medium.

According to a variant, the determination of TVBV is dependent on the VBV_delay.

According to a particular characteristic, the offset is equal to:

$$STCO=PTS-TVBV-TVSYNC-(\text{TimeRef}\times 40\text{ ms})-TDEC-LSTCpic$$

where:

TVSYNC corresponds to a frame period,

TDEC corresponds to the duration of decoding of the image, rounded to a higher number of frame periods, TimeRef represents the temporal reference of the image for the reordering, LSTCpic relates to the instant of detection of the first image.

According to a particular mode of operation, reading data in shifted mode (time shifting), the data being recorded on the basis of a write pointer, the recorded data being read in shifted time on the basis of a read pointer, a minimum gap is imposed between the read and write pointer and, when this gap is achieved, the freeze mode of the decoder is actuated.

The subject of the invention is also a device for synchronizing an MPEG decoder to a recorded MPEG stream, the recorded data consisting of PES data packets, characterized in that it comprises means for calculating an offset STCO to be applied to the local clock LSTC of the decoder so as to define a virtual clock VSTC, this offset being equal to the difference between the instant of presentation Tpres of the video of an image, as calculated in the LSTC tag, and the PTS value of presentation of this image originating from the coder and in that the decoding of the audio and video data are carried out when this virtual clock VSTC is equal to the PTS value.

Its subject is also a satellite decoder characterized in that it comprises an MPEG decoder and a synchronization device according to Claim 11, or else a television receiver, characterized in that it comprises an MPEG decoder and a synchronization device according to Claim 11.

The local recording on a hard disc of a program in PES form therefore requires that precautions be taken on replay: slaving of the local clocks and synchronization of the video and audio decoders.

The method proposed here strives to emulate the components of satellite transmission in such a way as to be able to operate the audio and video decoders in modes which are as similar as possible to their nominal manner of operation.

The main advantage of the invention is that it proposes a synchronization process which is simple to implement, requiring no utilization of the PCRs and avoiding the malfunctions which are generally encountered upon reading data from the hard disc.

BRIEF DESCRIPTION OF THE DRAWINGS

The characteristics and advantages of the present invention will be more apparent from the following description given by way of example and with reference to the appended figures, where.

DETAILED DESCRIPTION OF PREFERRED EMBODIMENTS

Management of the pointers.

Figure 1:
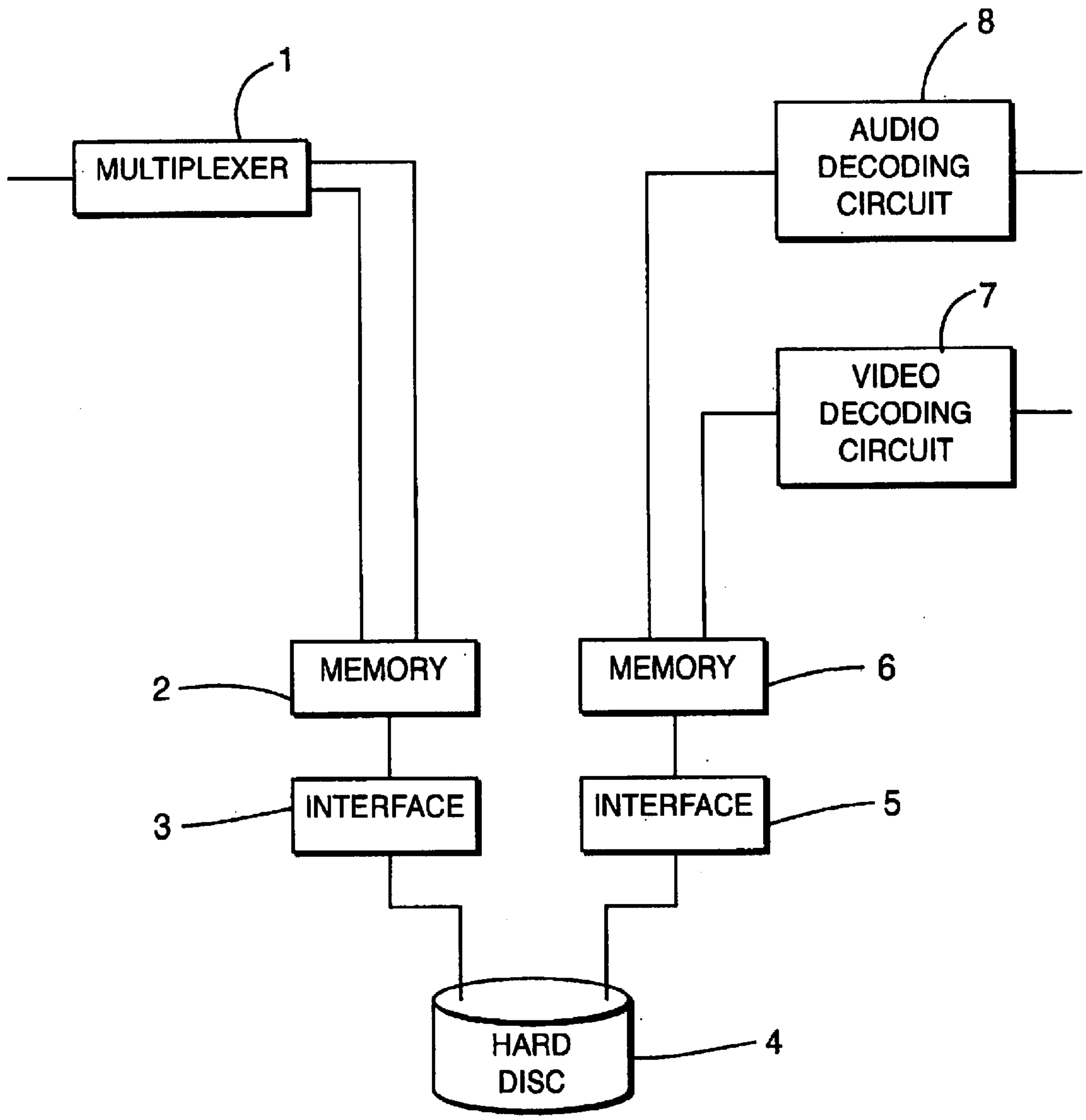
FIG. 1 represents a simplified diagram of a satellite decoder with hard disc.
Figure 2A:
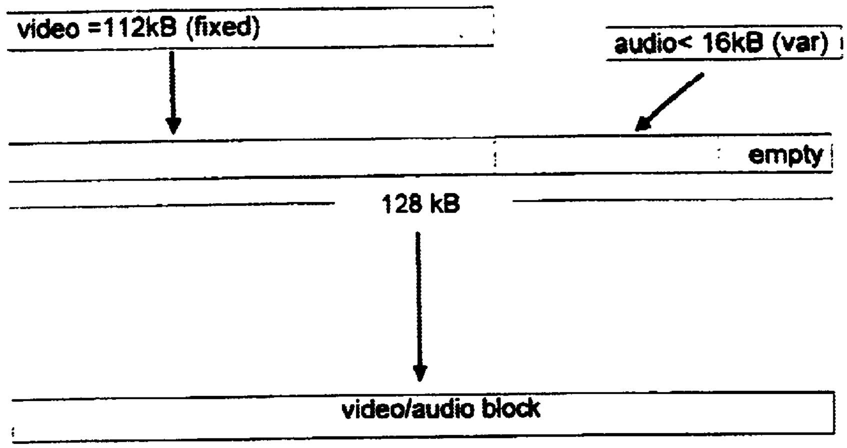
FIG. 2 represent the operation of writing the audio and video data to disc.
FIG. 2*b* represents the operation of reading the audio and video data from disc.
Figure 2B:
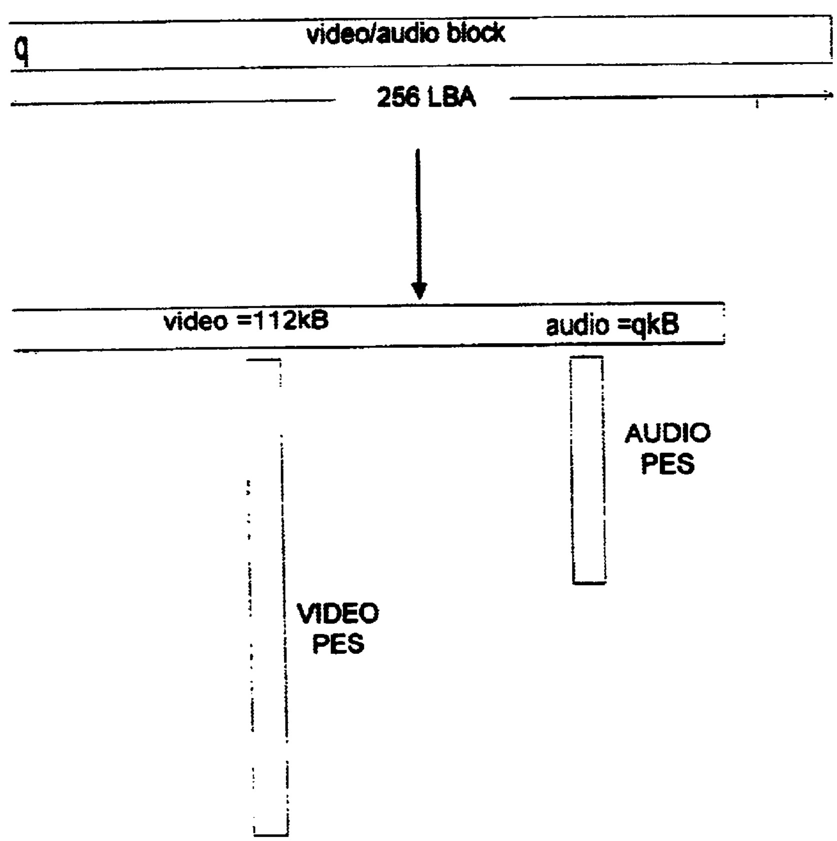

FIGS. 2*a* and 2*b* diagrammatically represent the manner of performing the storage and de-storage of the audio and video cues on the hard disc.

FIG. 2*a* corresponds to the operation of writing to the hard disc. The video and audio PESs are recorded on the disc in one and same 128 kB block (256 addressing blocks) [or lba, the acronym standing for logic block addressing] of 512 bytes). The video occupies 112 kB and the sound occupies a part of the remaining 16 kB, proportionally to the audio bit rate. The value q corresponding to the quantity of audio which arrives while the 112 kB of video are buffered, is written at the start of the 128 kB block and therefore corresponds to the quantity of audio stored. On recording a block the ratio of the video/audio bit rates ijs complied with.

FIG. 2*b* corresponds to the operation of reading the hard disc, the 112 kB of video are read so as to form the video PES stream at the same time as the quantity q kB of audio information (variable part) so as to form the audio PES stream.

Figure 3:
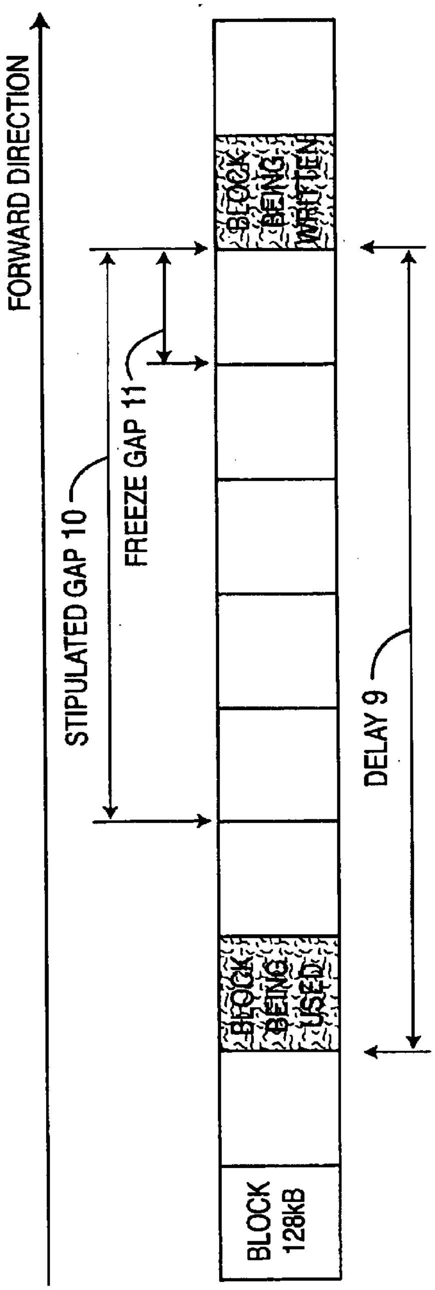
FIG. 3 represents the write and read pointers relating to the recorded data.

FIG. 3 represents a succession of data blocks, each of 128 kB, such as they are stored on the hard disc and the position of the read and write pointers for this hard disc. The double arrow referenced 9 represents the delay between the write pointer (vertical arrow on the right) and the read pointer (vertical arrow on the left). The double arrow referenced 10 represents a stipulated gap, here 5 blocks, which is the gap, predefined at the outset, between the pointers and the double arrow referenced 11 represents a freeze gap, that is to say a minimum gap causing image freeze.

The idea here is to ensure, via software, a minimum gap, for example of a 128 kB block between the pointers. When it is attained, the decoding is temporarily suspended by halting the reading of the memory of the decoder, thereby causing the image on the screen to freeze, until one block at least separates writing and reading. One does not seek, in fact, to re-establish the initial gap since the data are in any case lost and there is no benefit in keeping the image frozen with the sole aim of re-establishing the initial delay.

Audio/Video Synchronization.

Given the "interlaced" mode of storage of the audio and video data, the replaying of the two components of the program is necessarily done simultaneously. As a first approximation it may be said that the first video byte and the first audio byte reach their respective decoders at the same time. This does not mean to say that they will be decoded at the same time, on account of the time of transit of the video through its decoder.

It is known that, in order to avoid the use of a large-capacity audio buffer memory, the audio is phase-delayed from the time of coding. Thus, on replay, in standard mode (direct transmission) the audio is in phase with the video. This delay is determined at the coder and is dependent on the video bit rate.

When the data are recorded on hard disc and because they are no longer transmitted to the audio and video decoders with this video bit rate, a phase shift reappears between the audio and the video.

Figure 4:
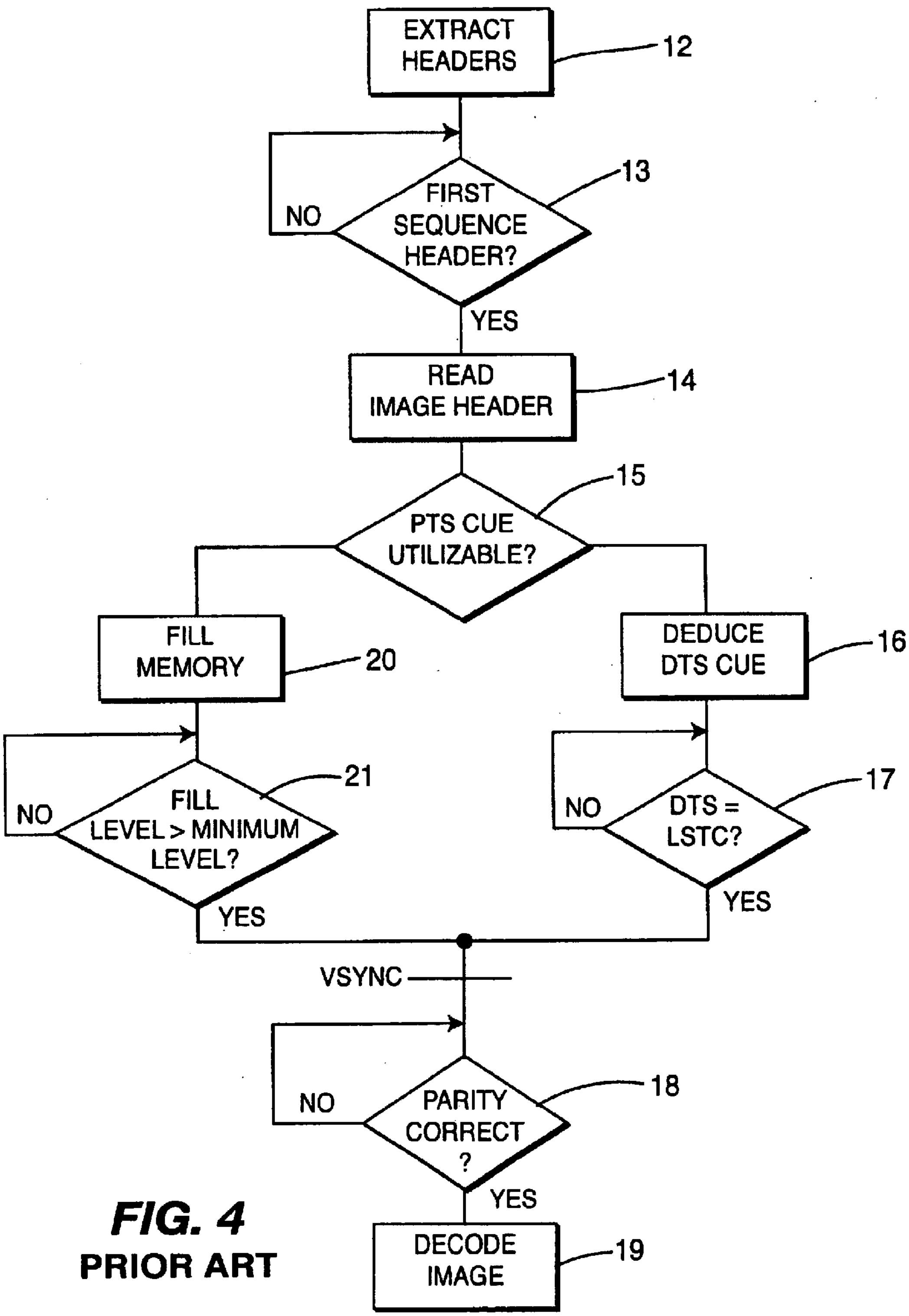
FIG. 4 represents the manner of operation of a video decoder on start-up according to the prior art.

The manner of operation of the video decoder on start-up, in the general case, is represented in FIG. 4 with the aid of a flow chart. This start-up is performed as follows:

The decoding procedure, step 12, receives the data stream so as to extract, among other things, the headers. Step 13 effects a loop until the first sequence header is detected. When such is the case, step 14 is implemented and consists in reading the image header which follows this sequence header. If the PTS cue is utilizable, check undertaken in step 15, the DTS cue is then deduced during step 16. Step 17 consists of a loop comparing DTS with the local clock LSTC. The loop output corresponds to equality and, on receiving the next sync signal (VSYNC), a parity test is performed during a step 18 triggering the decoding of the image, step 19, upon detection of the correct parity.

If the PTS cue is not utilizable, a step 20 consists in filling the buffer memory of the decoder. The step 21 checks the level of fill of this buffer memory. When the minimum level required for decoding is reached and on receiving the next sync signal a parity test is performed, step 18. The decoding of the image step 19 is performed upon detection of the correct parity.

The decoding of a video PES stream therefore commences under several conditions. Firstly, the decoder is unaware of the start of the stream until it encounters a start-up sequence, step 13. It therefore identifies the first sequence header (SEQ) which constitutes the point of entry of the stream. The data are then accumulated in the buffer of the decoder at a tempo corresponding to the bit rate of the transmission. After the sequence header, the image header (picture_header) is received by the decoder, step 14.

The cue relating to the minimum buffer level required for start-up of the decoding of this first image is in this header. Once this level is reached in the buffer (step 21), hence after a certain time related to the video bit rate, the decoder checks the correct parity (step 18) of the vertical synchronization signal (VSYNC) so as to order the decoding (step 19).

In the case where the VBV_delay is not available in the stream, it is the PTS (Presentation Time Stamp) cue which fixes the start-up of the decoding.

Concerning start-up, the main differences between direct reception (that is to say without involving storage on disc) and replaying of the data from a hard disc are:

- the read bit rate which may be seen as infinite in respect of the disc,
- the absence of local clock (LSTC Local System Time Clock) synchronized to the PCR (Program Clock Reference) cue.

By virtue of the high video bit rate which is possible during the filling of the buffer from the hard disc during the start-up of a stream, the decoding of the first image will occur sooner than for direct reception, causing a phase shift between the audio and the video. The synchronization of the audio associated with the video, such as implemented in the invention and as explained hereinbelow, makes it possible to avoid such a phase shift.

The LSTC normally has a major role in stream control and in synchronizing the audio with the video. Stream control is not a problem when the data originate from the disc since transmission is halted as soon as the memory buffers are full. There is therefore no risk of data loss. On the other hand, a reference clock is still necessary so as to allow the synchronization of the audio with the video. The utilization of a virtual STC clock (VSTC) recreated from the PTS cues of the video allows this synchronization.

The Virtual STC must be initialized as soon as possible by the video procedure so as to allow the audio to synchronize itself with this clock. The cues required for its initialization are:

the value of the local STC counter (LSTC).

the PTS of the first image.

the VBV_delay of the first image (if present).

the time reference of the first image (TimeRef) used for the reordering of the images.

the parity of the vertical sync VSYNC.

Given the high bit rate available on reading the disc, these cues which are obtained on acquiring the first image header (PIC header) are available very rapidly.

Figure 5:
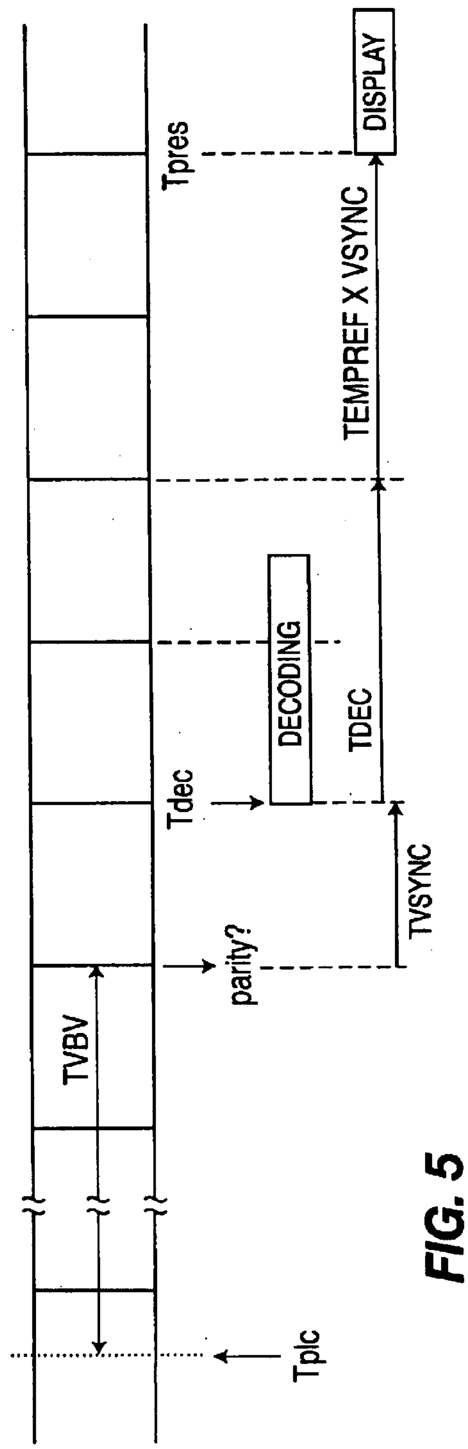
FIG. 5 represent the various steps required in the presentation of a decoded image.

FIG. 5 represents, diagrammatically, the various steps in time which are required for the representation of a decoded image. The upper end represents the succession of data which have been stored on the disc and which are now being read. This band is chopped into frame periods.

Hereinbelow, the following notation will be adopted:

Tpic to represent a date (lower case letters after T).

TVBV to represent a duration (upper case letters).

After detection of the first image header after the sequence header, reading and recording of the blocks takes place in the buffer of the decoder during a time TVBV corresponding to VBV_delay. After this time, a parity check is performed. If the sync signal is of opposite parity to that of the image which is ready to be decoded, the case in the figure, a duration equal to TVSYNC (20 ms) is added to determine the instant of decoding. This instant is called Tdec. If the actual duration of the decoding is greater than a frame period (the case in the figure in which the duration is represented by a rectangle containing the inscription “decoding”), the duration of decoding taken into account TDEC is chosen equal to an integer number of durations TVSYNC which is immediately greater than the actual duration. If Tpres is the actual instant of display of the decoded image, the gap between Tpres and Tdec is equal to TDEC+TimeRef×TVSYNC, TimeRef being the time reference serving in the reordering of the images.

As soon as possible, the decoding of the image, instant Tdec, commences at the first sync VSYNC of correct parity which follows the instant at which the level of the buffer memory has reached the level corresponding to the lag VBV_delay at the nominal bit rate. Here again, the high bit rate on reading the disc means that the filling time of the decoder buffer is small and much less than the VBV_delay. This bit rate can easily be 20 times larger than that of satellite transmission. To give some kind of idea, the filling of the buffer of the decoder of capacity 1.8 Mbit, with a satellite transmission bit rate of 4 Mbit/s, requires 0.45 s. This lag is reduced to 0.03 s when the filling is undertaken from a hard disc.

One would therefore be able to commence the decoding of the video sooner, without needing to wait for this duration VBV_delay. However, the audio and video must remain synchronized. Since the decoding of the audio cannot itself be brought forward in the same way, the audio would lag behind the video. Such a situation is not desirable since it demands that audio data be rapidly ignored so as to catch up.

To alleviate this drawback and hence to compensate for the high bit rate offered by the disc, a delay called TVBV is deliberately imposed on the video. This delay makes it possible to simulate the original VBV_delay.

$$TVBV=VBV\_delay$$

If the VBV_delay cue is not available in the stream, it can be replaced, in the formula, with the size of the decoder buffer (std_buffer):

$$TVBV=\text{std\_buffer/BitRateSat)}-\text{std\_buffer/BitRateDisk)}$$

This duration is dependent on the video bit rate (satellite transmission bit rate BitRateSat) and on the bit rate of the disc (BitRateDisk).

Since the bit rate of the disc is very much greater than that of the satellite, the following approximation may be made:

$$TVBV=std\_\text{buffer/BitRateSat.}$$

The value BitRateSat is calculated while writing. This is because the number of bytes written during a time unit is known.

The size of the buffer is generally 1.8 Mbits.

Once this delay has elapsed, decoding can commence. However, in certain set-ups, the addition of a 20 ms delay may turn out to be necessary in order to wait for the correct parity of the Vertical Sync. Since it is preferable to guarantee that audio start-up will not be delayed relative to the video rather than the reverse, a 20 ms lag (TVSYNC) which allows this rephasing with the Vertical Sync (VSYNC) is introduced by default. The start date of decoding (Tdec) relative to the date of detection of the first image (Tpic) is then:

$$Tdec=Tpic+TVBV+TVSYNC$$

Knowing the start instant of decoding (Tdec), the instant of presentation (Tpres) is dependent on the time reference of the image (TimeRef)and on the lag required for its decoding (TDEC):

$$Tpres=Tdec+\text{TimeRef*40 ms}+TDEC$$

Tdec is dependent on the implementation of the decoder (typically 20 ms or 40 ms). In the application, the implementation time is 40 ms.

On replacing Tdec by the value calculated above:

$$Tpres=Tpic+TVBV+TVSYNC+\text{TimeRef*40 ms}+TDEC$$

The date Tpic which is the value of the local clock LSTC at the exact moment that the first image was detected is not necessarily known. This is because, for example in our system, the implementation of the clock LSTC allows its value to be sampled only every 20 ms. It is therefore advisable to replace it with the following formula in which LSTCpic represents the value of the clock LSTC available (sampled at the previous vertical sync) at the moment that the first image is detected:

$$\text{Tpic=LSTCpic}$$

and $$Tpres=LSTCpic+TVBV+TVSYNC+\text{TimeRef*40 ms}+TDEC$$

An offset value is now calculated, corresponding to the gap between the actual instant of presentation of the image, Tpres, and the instant of presentation desired by the coder, PTS. This instant PTS is only of significance provided that the clock of the decoder has been initialized and synchronized to the PCR. Here, this value PTS is used not to define a time of presentation in the absolute but to enable the instants of audio and video decoding to be synchronized (same PTSs).

The offset is therefore the correction STCO (System Time Clock Offset) to be made on the local clock so that the instant of presentation of the image, Tpres defined on the basis of this local clock, corresponds to the PTS label:

$$Tpres+STCO=PTS$$

$$STCO=PTS-TVBV-TVSYNC-(\text{TimeRef}\times 40\text{ ms})-TDEC-LSTCpic$$

We have thus defined a virtual clock VSTC such that:

$$VSTC=LSTC+STCO$$

This virtual clock serves as reference for the synchronization of the audio.

When the value of VSTC is equal to PTS, the audio presentation can be performed and will therefore be in phase with the video presentation.

The purpose of these calculations is to forecast the effective instant of presentation of the video relating to an image (time LSTC any multiple of 20 ms) so as to calculate the shift with the theoretical value PTS relating to the video for this image. This shift is then utilized to define the effective instant of presentation of the audio data.

The audio PTS could also be used to initialize the VSTC and in this case the audio would be the master. This solution is not adopted since the frequency of presence of the PTSs in the audio frame is low.

It may be observed that, if there is no discontinuity in the decoding procedure, the video decoding and the VSTC remain synchronous. It may be then be verified that VSTC=PTS on presentation of each image.

Two types of imponderables may disturb the video decoding procedure:

- disturbances related to the stream read out from the disc may give rise to delays in the presentation of certain images or else forward jumps following the reinitialization of the decoder and following the loss of data.
- the execution of "trick-modes" called for by the application (term used in the standard and corresponding to special modes of operation such as freeze frame, etc.) during which the LSTC is no longer meaningful.

In all cases, it is advisable to reinitialize the VSTC as on start-up or by saving a fallback value (the case of a pause).

The offset must be regularly re-updated (slippage of the clock LSTC relative to the PTS which is synchronized with the PCR). The image period could be taken as refresh period.

The start-up of the decoding of the audio is more immediate than that of the video. It is sufficient to take the VSTC into account in order to know when to start. It is of course necessary to wait for the VSTC to be initialized by the video.

Insofar as one is certain that the VSTC remains properly synchronous with the decoding of the video, the synchronizing of the audio with the video is carried out entirely naturally by the slaving thereof to the VSTC. It may however happen that the audio decoder is not synchronous with the 27 MHz reference clock which regulates the video decoder, but with an independent clock. The audio decoder must in this case be slaved to the VSTC.

Of course, the MPEG decoder and the hard disc have been presented integrated within a satellite decoder. These elements or one of these elements could just as easily form part of a digital television receiver receiving the compressed data.

The incoming stream is described as being a program stream PS. It can also, without departing from the field of the invention, pertain to a transport stream TS.

What is claimed is:

1. A process for synchronizing an MPEG decoder for the decoding of compressed data originating from a recording medium, these data consisting of PES (Packetized Elementary Stream) audio and video data packets, the process comprising the steps of:

- calculating an actual instant of presentation Tpres of the video of an image, this instant relating to a local clock LSTC,
- calculating an offset STCO between this calculated instant of presentation and the PTS label corresponding to the instant of presentation desired by the coder for the video of this image, so as to define a virtual clock VSTC=STCO+LSTC,
- wherein the presentation of the video corresponding to this image being made at the PTS dates relating to the virtual clock VSTC.

2. The process according to claim 1, wherein the time of transit of the video through the buffer of the video decoder is imposed at a predetermined value TVBV.

3. The process according to claim 2, wherein the determination of TVBV is dependent on the bit rate of recording of the PES data on the recording medium.

4. The process according to claim 2, wherein the determination of TVBV is dependent on the VBV delay.

5. The process according to claim 1, wherein the offset is dependent on the duration of decoding of the image (TDEC), rounded to a higher number of frame periods.

6. The process according to claim 1, wherein the calculated offset is incremented by one frame period (TVSYNC).

7. The process according to claim 2, wherein the offset STCO is equal to:

$$STCO=PTS-TVBV-TVSYNC-(\text{TimeRef}\times 40\text{ ms})-TDEC-LSTCpic$$

where:

- TVSYNC corresponds to a frame period,
- TDEC corresponds to the duration of decoding of the image rounded to a higher number of frame periods,
- TimeRef represents the temporal reference of the image for the reordering, and
- LSTCpic relates to the instant of detection of the first image.

8. The process according to claim 1, wherein the virtual clock VSTC is re-updated on start-up, when executing "trick-modes" or on reinitialization of the video decoder.

9. The process according to claim 1, wherein the virtual clock VSTC is re-updated with each image.

10. The process according to claim 1, for reading data in shifted mode (time shifting), the data being recorded on the basis of a write pointer, the recorded data being read in shifted time on the basis of a read pointer, wherein a minimum gap is imposed between the read and write pointers and, when this gap is achieved, the freeze mode of the decoder is actuated.

11. A device for synchronizing an MPEG decoder to a recorded MPEG stream, the recorded data consisting of PES data packets, comprising means for calculating an offset STCO to be applied to the local clock LSTC of the decoder so as to define a virtual clock VSTC, this offset being equal to the difference between the instant of presentation Tpres of the video of an image, as calculated in the LSTC tag, and the PTS value of presentation of this image originating from the coder, the decoding of the video data being carried out when this virtual clock VSTC is equal to the corresponding PTS value.

12. Satellite decoder comprising an MPEG decoder and a synchronization device according to claim 11.

13. Television receiver comprising an MPEG decoder and a synchronization device according to claim 11.

* * * * *